United States Patent
Lindholm et al.

(10) Patent No.: US 8,745,715 B2
(45) Date of Patent: Jun. 3, 2014

(54) PASSWORD-BASED AUTHENTICATION SYSTEM AND METHOD IN GROUP NETWORK

(75) Inventors: Fredrik Lindholm, Älvsjö (SE); Mats Naeslund, Vällingby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 2627 days.

(21) Appl. No.: 10/552,955

(22) PCT Filed: Apr. 16, 2003

(86) PCT No.: PCT/SE03/00631
§ 371 (c)(1),
(2), (4) Date: Oct. 14, 2005

(87) PCT Pub. No.: WO2004/093381
PCT Pub. Date: Oct. 28, 2004

(65) Prior Publication Data
US 2006/0236384 A1    Oct. 19, 2006

(51) Int. Cl.
*G06F 7/04* (2006.01)
*G06F 15/16* (2006.01)
*G06F 17/30* (2006.01)
*H04L 29/06* (2006.01)
*H04L 9/32* (2006.01)

(52) U.S. Cl.
USPC ............... 726/9; 726/6; 726/7; 713/169

(58) Field of Classification Search
USPC .......... 713/155, 160–164, 168–174, 176, 713/182–186; 380/277
See application file for complete search history.

(56) References Cited

U.S. PATENT DOCUMENTS

| | | | | |
|---|---|---|---|---|
| 4,980,542 A * | 12/1990 | Jackson et al. | ............... | 235/375 |
| 5,491,752 A * | 2/1996 | Kaufman et al. | ............... | 380/30 |
| 5,778,065 A * | 7/1998 | Hauser et al. | ............... | 713/155 |
| 6,215,877 B1 * | 4/2001 | Matsumoto | ............... | 380/277 |
| 6,397,329 B1 * | 5/2002 | Aiello et al. | ............... | 713/155 |
| 6,668,167 B2 * | 12/2003 | McDowell et al. | ......... | 455/412.1 |
| 6,721,886 B1 * | 4/2004 | Uskela | ............... | 713/168 |
| 6,792,533 B2 * | 9/2004 | Jablon | ............... | 713/171 |
| 6,885,388 B2 * | 4/2005 | Gunter et al. | ............... | 715/751 |
| 7,076,656 B2 * | 7/2006 | MacKenzie | ............... | 713/171 |
| 7,363,494 B2 * | 4/2008 | Brainard et al. | ............... | 713/168 |
| 2002/0023216 A1 | 2/2002 | Noguchi | | |
| 2002/0053035 A1 * | 5/2002 | Schutzer | ............... | 713/202 |
| 2002/0129247 A1 | 9/2002 | Jablon | | |
| 2002/0162019 A1 | 10/2002 | Berry | | |
| 2003/0056119 A1 | 3/2003 | Pisarsky | | |

\* cited by examiner

*Primary Examiner* — Philip Chea
*Assistant Examiner* — Trong Nguyen (57) ABSTRACT

The invention relates to password-based authentication in group networks. Each device has an authentication token irreversibly based on the password. The authentication involves a first device at which the password P is entered and a second device towards which the authentication occurs. The first device determines a check token $M_j$ for the second based on the password and its own authentication token $R_i$ and this check token is sent to the second device, where it is compared with the authentication token of that device. The procedure may include update of a device to exclude a non-trusted device from the group or change the password. Advantageous features are that the information in one device does not allow retrieval of the password and that the password is only exposed at one device, and only temporarily, during the authentication.

42 Claims, 6 Drawing Sheets

PASSWORD-BASED AUTHENTICATION SYSTEM AND METHOD IN GROUP NETWORK

TECHNICAL FIELD

The present invention generally relates to security in communication systems and in particular to password-based authentication in group networks.

BACKGROUND

In recent years, there has been an increasing interest in dynamical group networks referred to as ad-hoc networks, which basically can form wherever two or more nodes using the same means to communicate are present. Every node in the network can act as a router forwarding packets for other nodes or there is only broadcast communication. Hence, ad hoc networks do not need a centralized control organ and can very quickly be formed, merged together and partitioned into separate networks on the fly, without relying on a fixed infrastructure. An advantageous feature of such networks is that comparatively small and simple devices can be used as nodes, including Personal Digital Assistants (PDA), laptops and cellular phones. Wireless communication is generally used to interconnect at least some devices, but the network may also include static and wired nodes.

Ad hoc networks can comprise Local Area Networks (LAN), such as workstations in the same building interconnected to share the resources of a server, as well as group networks managed by individual persons, commonly referred to as Personal Area Networks (PAN). A PAN is generally associated with a small coverage and consists of networked personal devices in close vicinity of the owner. Typical PAN nodes are PDAs, printers, personal computers, digital cameras, mobile phones and MP3 players, but the network may also include household appliances such as refrigerators and vacuum cleaners. Ad hoc communication in a PAN can use various technologies. The Bluetooth technology, for example, may often be an appropriate choice for wireless communication between mobile devices in a PAN.

Interconnecting personal devices into group networks leads to some obvious advantages. Nevertheless, it lies in the nature of such networks that they are very vulnerable to attacks by unauthorized intruders. A main reason for this is that the communication often uses radio frequencies and is therefore easy to eavesdrop on. Moreover, portable devices are naturally easier to steal. Finally, if countermeasures are not taken, the ad-hoc nature implies a high risk of a rogue device entering the network. The consequences may for instance be devastating if a malicious intruder is passed as a member of the group and allowed to send instructions to the other group members and get access to secret information stored therein. Well-functioning security solutions are hence crucial for group networks like PANs to become widely spread in the future. In particular, there is a need for secure mechanisms for excluding non-trusted group members, e.g. by revoking the privileges of stolen devices.

In a PAN, a normal everyday user is the manager of the group and user convenience is highly prioritized. A most desirable feature of PAN security mechanisms, such as mechanisms for user authentication and for revocation of group members, is therefore that they are user-friendly, preferably based on simple user passwords.

According to a well-known prior-art method for password-based authentication towards a device, the "hash value" of the password is stored in the device. When a password is input to the device, the corresponding hash value is determined. The device then compares this hash value with the locally stored value, which are to be identical if the input password is correct. Typically, the user immediately gets some kind of indication of whether the authentication succeeded.

The described method can be applied onto a group network, generally using one common password for all group members in order to achieve simple network management. However, this solution is associated with severe drawbacks, since anyone hacking a group member is able to retrieve the locally stored hash value and use it to guess and verify the correct password. Since passwords tend to be rather short, e.g. four digits/characters, it is often feasible to try all possible passwords in an automated attack. This illustrates a major problem of conventional password-based mechanisms, i.e. that the password generally can be "reverse-engineered" by means of the information stored in a stolen device.

Accordingly, the authentication mechanisms of conventional tele-communication systems are far from satisfactory and there is a considerable need for an improved procedure for password-based authentication of group members.

SUMMARY

A general object of the present invention is to provide an improved security solution for group networks. A specific object is to provide an improved mechanism for password-based authentication of group members. Another object is to achieve secure revocation of group members.

These objects are achieved in accordance with the attached claims.

Briefly, a new way of performing password-based authentication of devices in group networks, such as ad hoc networks and PANs, is proposed. Each group member is provided with an authentication token, which is created by means of the password but nevertheless cannot be used to recreate the password nor to verify that a password guess is correct. This can for example be achieved by using a bijective locking function to which a common secret and a one-way function of the password are input. The authentication involves two devices, a first device to which the password is input and a second device towards which the authentication occurs. The first device determines a check token for the second based on the identity of that device, the password and its own authentication token. This check token is transferred to the second device, where it is compared with the authentication token thereof. If these tokens match, the input password is correct and the authentication succeeds.

Preferably, the password as well as all significant parameters generated in the process except the authentication token of each device are erased after usage. In this way, the information contained in one device does not permit retrieval of the password, which results in a high level of security. Another major advantage offered by the invention is that the password only has to be temporary exposed at one single device during an authentication event.

A preferred embodiment of the invention includes update of a device and can be used, among other things, for revocation of a non-trusted device or for changing the password. It is even possible to exclude a group member without changing the password, which is often convenient for the user. Other embodiments of the invention achieve secure delegation of update rights as well as mutual (bilateral) authentication between group members. Furthermore, policies limiting the number or frequency of authentication attempts are preferably implemented, in particular if the authentication response is communicated back to the user.

According to other aspects of the invention a communication system and a device with means for password-based authentication, as well as a computer program product for password-based authentication are provided.

BRIEF DESCRIPTION OF THE DRAWINGS

The invention, together with further objects and advantages thereof, is best understood by reference to the following description and the accompanying drawings, in which.

DETAILED DESCRIPTION

Throughout the drawings the same reference numbers are used for similar or corresponding elements.

Figure 1:
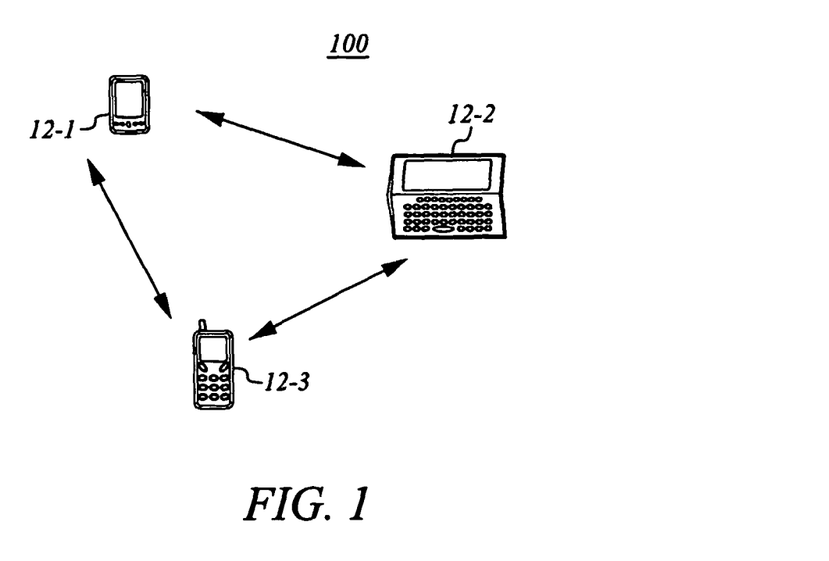
FIG. 1 is a schematic view of an exemplary group network in which the present invention can be used.

FIG. 1 is a schematic view of an exemplary group network in which the present invention can be used. A rather small network 100 is shown, consisting of a PDA 12-1, a laptop 12-2 and a cell phone 12-3, forming a so-called Wireless Personal Area Network (WPAN). Other personal devices may be included in the PAN, such as printers, MP3-players, digital cameras and various household appliances (refrigerators, vacuum cleaners, etc). In fact, the invention is not limited to PANs, but can be used in any kind of group network including other groups connected in an ad hoc fashion. A typical feature of such an ad hoc network is that some devices are part of the network only during a communication session or while in close proximity to the rest of the network.

The group network in accordance with the invention includes at least two nodes associated with a common password, e.g. a PIN-code. The group is generally managed by a single user, but there may be cases where two or more users, e.g. members of the same household, share a password. The nodes can be interconnected by wireless connections as in FIG. 1, e.g. using Bluetooth or Infrared technology, or cable connections and combined wireless/wired networks are common.

Figure 2:
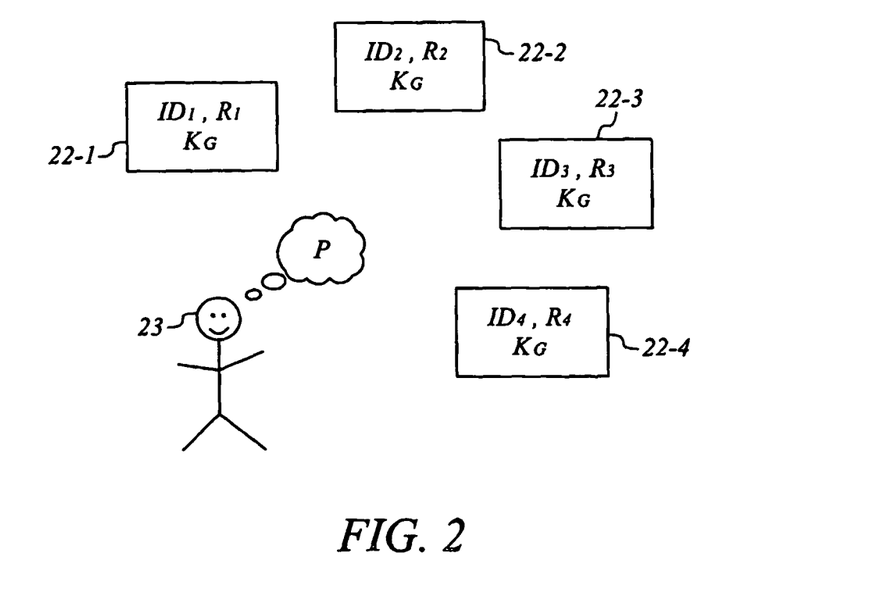
FIG. 2 is a schematic view of the basic components of a group network according to an exemplary embodiment of the present invention.

FIG. 2 is a schematic view of the basic components of an exemplary group network in accordance with the invention. A network composed of four devices/units 22 with separate identities $ID_i$, i=1, . . . , 4, and handled by a user 23 is illustrated. Each device has been provided with an identical group key $K_G$ for secure communication within the group, using well-known conventional authentication techniques. This key is primarily intended to be used when the devices communicate with a minimum of user-interaction, e.g. when they need to automatically connect to each other. By means of $K_G$ the devices can verify that they belong to the same group network. There may also be individual key pairs $K_{ij}$ (not shown), i=1, . . . , 4 and j=1, . . . , 4, to enable secure communication between two specific members of the group. The keys $K_G$ and $K_{ij}$ are typically installed in the devices during set-up/initial handshake procedures. The user has a password P for managing the group network. All devices of the group are thus associated with the same password P.

Besides authentication occurring "automatically" between devices, the user in some cases need to authenticate himself to a particular device. In order to achieve password-based user authentication in accordance with the invention, each device in the group has a unique authentication token $R_i$ (i=1, . . . , 4 in FIG. 2). Typically, each authentication token $R_i$ is stored in the corresponding device, preferably tamper-resistantly protected, but there may also be cases where one or more $R_i$ are externally stored, for example at a secure server from which they are retrieved when needed for authentication purposes. The authentication tokens are assigned such that no individual authentication token alone permits retrieval of the password nor provides means to verify that a guessed password is correct. Preferably, the authentication token should not reveal any information on the password at all. $R_i$ is thus a one-way function of the password P and preferably also depends on a token secret S, which is a basic group key/secret individually uncorrelated both with the password P and with the authentication token $R_i$. Each authentication token $R_i$ is then created from the same token secret S and the password P in a way that will be described later with reference to FIGS. 7 and 8. Now a brief explanation of the relationship between $R_i$, S and P according to a preferred embodiment of the invention follows.

The authentication token $R_i$(i=1,2, . . . , n for a group of n devices) is the result of a locking function E of $H_i$ and the token secret S:

$$R_i=E(H_i, S)$$

$H_i$ is in turn given by the expression:

$$H_i=f(ID_i\|P)$$

i.e. a one-way function f of the password P and of the respective device identity $ID_i$. $\|$ indicates string concatenation.

The locking function E is a bijective function in the second input with an inverse function denoted D (D=$E^{-1}$), which implies that the token secret S may be unlocked through:

$$S=D(H_i, R_i).$$

The described relationships can be used for secure password-based authentication in accordance with the present invention.

Password-Based Authentication

Figure 3:
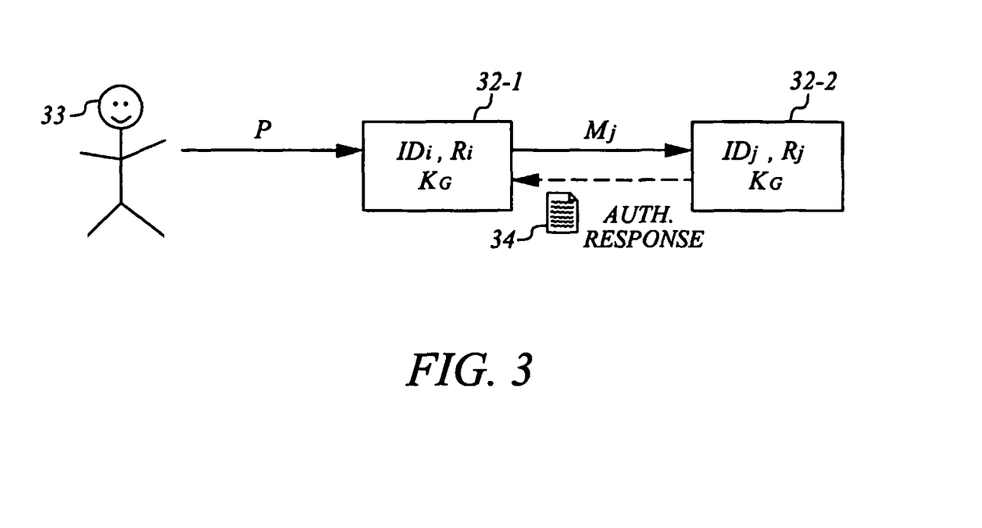
FIG. 3 illustrates authentication towards a group member according to an exemplary embodiment of the present invention.

FIG. 3 illustrates authentication towards a group member according to an exemplary embodiment of the present invention. The basic idea of the invention relies on using one device in the group for authentication towards one or more other group members. In the illustrated example, the user 33 wishes to perform actions towards device j 32-2, such as sending revocation instructions, for which his explicit authorization needs to be verified. The user chooses another member of the group network, device i 32-1, to handle the authentication and inputs a password P at this device. Device i then uses a combination of its own authentication token $R_i$ and the password to unlock the token secret S according to the following steps:

$$H_i = f(ID_i \| P) \quad \text{i)}$$

$$S = D(H_i, R_i) \quad \text{ii)}$$

Thereafter, device i uses S and P to create a check token $M_j$ for device j:

$$H_j = f(ID_j \| P) \quad \text{iii)}$$

$$M_j = E(H_j, S) \quad \text{iv)}$$

The check token $M_j$ represents the authentication token that should be available at device j if the user has input the correct password. $M_j$ is sent to device j, preferably protected by means of the key pair $K_{ij}$, where it is compared with the actual authentication token $R_j$ of device j. If $M_j$ equals $R_j$ the authentication is successfully completed and the user can be trusted by device j. Should, on the other hand, $M_j$ be different from $R_j$, the authentication fails and device j does not listen to instructions from device i that require explicit user authorization. It could, however, still accept other types of messages. In some cases, it may be appropriate to let device j 32-2 communicate the result of the authentication comparison to device i 32-1 by sending an authentication response message 34, as indicated by the dashed arrow in FIG. 3.

The described procedure may with advantage be used for authentication with one device i towards several devices in the group, or even all other group members. The steps iii and iv above are then repeated for each device j (j=1, . . . , n and j≠i).

The only strict requirement on the assigning device i is that it must have an input unit or the like, e.g. a keyboard, for receiving the password. Since configuration actions could be called for anytime and anywhere, they should preferably be possible to invoke from any device belonging to the group. In a preferred embodiment of the invention each group member is therefore provided with a simple input unit, making it capable of acting as authenticator like device i above.

The password P and S should preferably be erased as soon as possible after usage thereof, whereby they are only temporary exposed at device i. In a most preferred embodiment, all parameters participating in the authentication procedure, including P, S and intermediates like $H_i$, are deleted when no longer needed, except the respective authentication tokens $R_i$.

The password-based authentication of the invention results in some major advantages. The password only needs to be exposed at one device in the group during the authentication procedure. This implies a considerably improved password management and security compared to conventional authentication where the password is exposed at each unit. Moreover, the information of a single group member, i.e. its authentication token, does not allow retrieval or brute force search of the password. This means that it is not possible to obtain the password from a single stolen device by using the information therein. Neither can one device be used to "fool" another device without knowledge of the password.

Authentication and Update

The purpose of the authentication is generally to send update information, such as revocation information or a new password, to one or several group members. In such a case, an updating procedure is integrated into the authentication procedure in a way illustrated by FIGS. 4 and 5.

Figure 4:
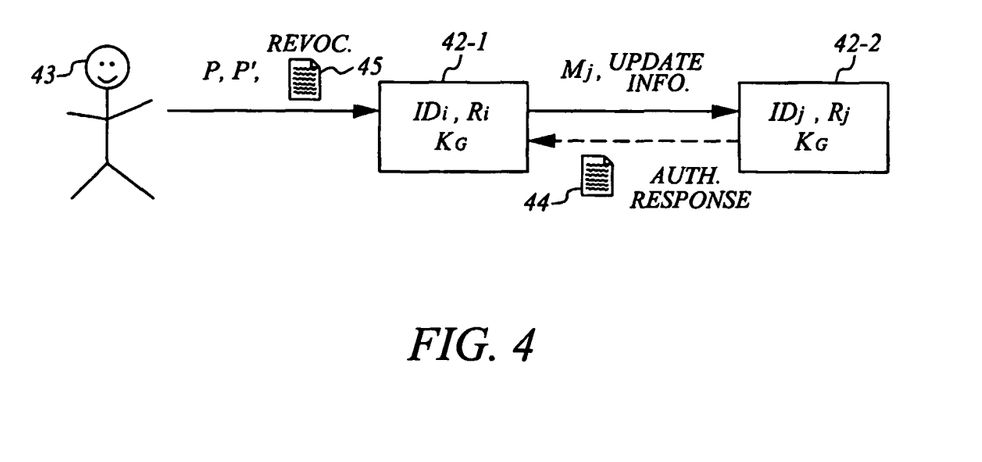
FIG. 4 illustrates authentication and update according to a preferred embodiment of the present invention.

FIG. 4 illustrates authentication towards and update of a device j 42-2 with a device i 42-1 according to a preferred embodiment of the invention. As before, the user 43 enters the password P of the group network at device i. If the user wants to change the password and/or exclude one or several devices from the group, a new password P' and/or revocation information 45, e.g. a list of non-trusted devices, are also input to device i. The token secret S is determined at device i through steps i and ii above. However, in this case some additional preparations are needed before the actual authentication and updating phases. First, a new token secret S' is created, preferably by conventional random value generating means. S' and P' are then used at device i to create a new authentication token $R_i'$ for itself according to:

$$H_i' = f(ID_i \| P') \quad \text{v)}$$

$$R_i' = E(H_i', S') \quad \text{vi)}$$

The authentication token $R_i$ stored in device i (or externally) is replaced with the new authentication token $R_i'$.

The check token $M_j$ for the authentication is created according to steps iii and iv above but this time a new authentication token $R_j'$ for device j is determined as well:

$$H_j' = f(ID_j \| P') \quad \text{vii)}$$

$$R_j' = E(H_j', S') \quad \text{viii)}$$

Thereafter, the check token $M_j$ is transferred from device i to device j, where the authentication comparison between $M_j$ and $R_j$ is performed in the above-described way. The authentication response message 44 sent from device j in FIG. 4 to indicate the result of the authentication is optional. Only if the tokens match and the authentication thus is successful, device j agrees on being updated by device i. In such a case, update information can be successfully transferred to device j. The key par $K_{ij}$ or another a security mechanism is preferably employed also for this transfer of information.

The update information for device j comprises the new authentication token $R_j'$ and possibly also revocation information and/or a new group key $K_G'$. The revocation information is preferably protected and may include a revocation list containing the devices to be excluded or an equivalent group-defining list of the devices still being part of the group. Through such a list the device j can be instructed to ignore a non-trusted device. Moreover, the list can be especially useful during a period of time in the update when some trusted devices have not yet been updated with the new group key $K_G'$, and the fact that a device can prove possession of a particular group key is thus not sufficient to distinguish between trusted and non-trusted devices. The new group key $K_G'$ is typically included in the update information if the update is related to group-defining measures, such as revocation.

The described procedure may with advantage be used in order to change the password P, exclude a non-trusted member from the group, or achieve both a password change and revocation at the same time. If the user does not wish to change the password, P' is equal to P in the above equations. The fact that the invention enables revocation of a device without changing the password constitutes another advantageous feature thereof. The user is spared the trouble of having to invent and remember a new password every time the group network is redefined, which simplifies the management of the group.

Figure 5:
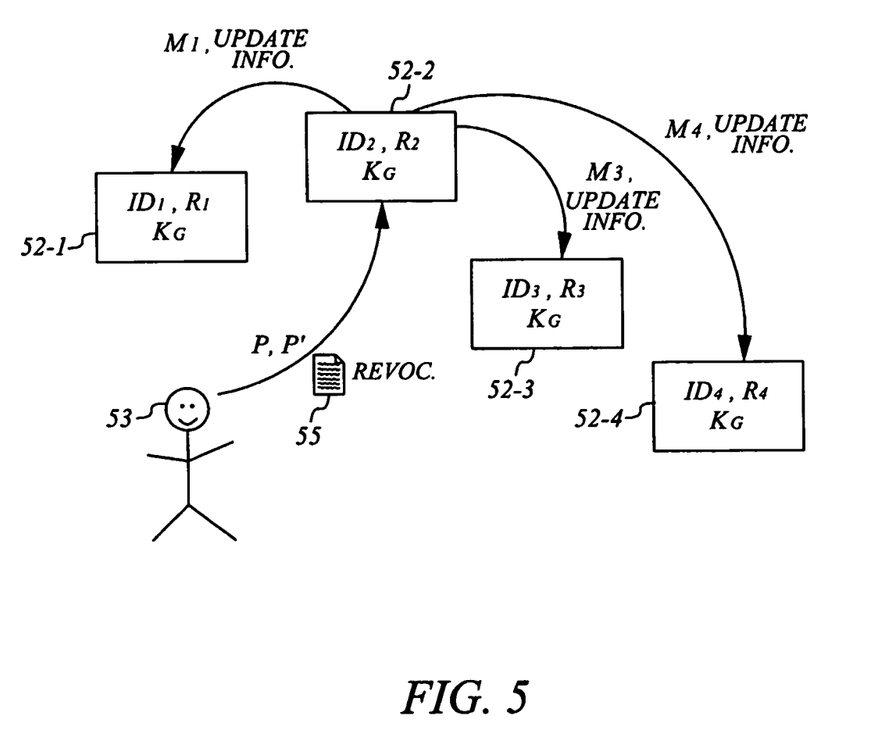
FIG. 5 illustrates authentication and update in a group network according to a preferred embodiment of the present invention.

FIG. 5 visualizes authentication and update in a group network according to an exemplary embodiment of the invention. In the illustrated example, the group manager 53 uses the device 52-2 with identity $ID_2$ for authentication and update towards the other devices 52-1, 52-3, 52-4 by means of the above-described mechanism. The passwords P, P' and revocation information 55 are thus entered at device 52-2, which repeats the steps iii, iv, vii and viii for each device j (j=1, 3, 4) to obtain the respective check tokens and update information. The new password P' is like the previous password P only exposed at device 52-2 and together with all parameters except the new authentication tokens $R_i'$ (i=1, 2, 3, 4) preferably deleted immediately after usage.

Generally, the update procedure is initiated by the group manager in the above-described way. Solutions where one device in the group network initiates update by sending a request to another device also lie within the scope of the invention. In one embodiment, a unit that is switched-on after an inactive period for example automatically asks for appropriate update information from at least two other units.

Figure 6:
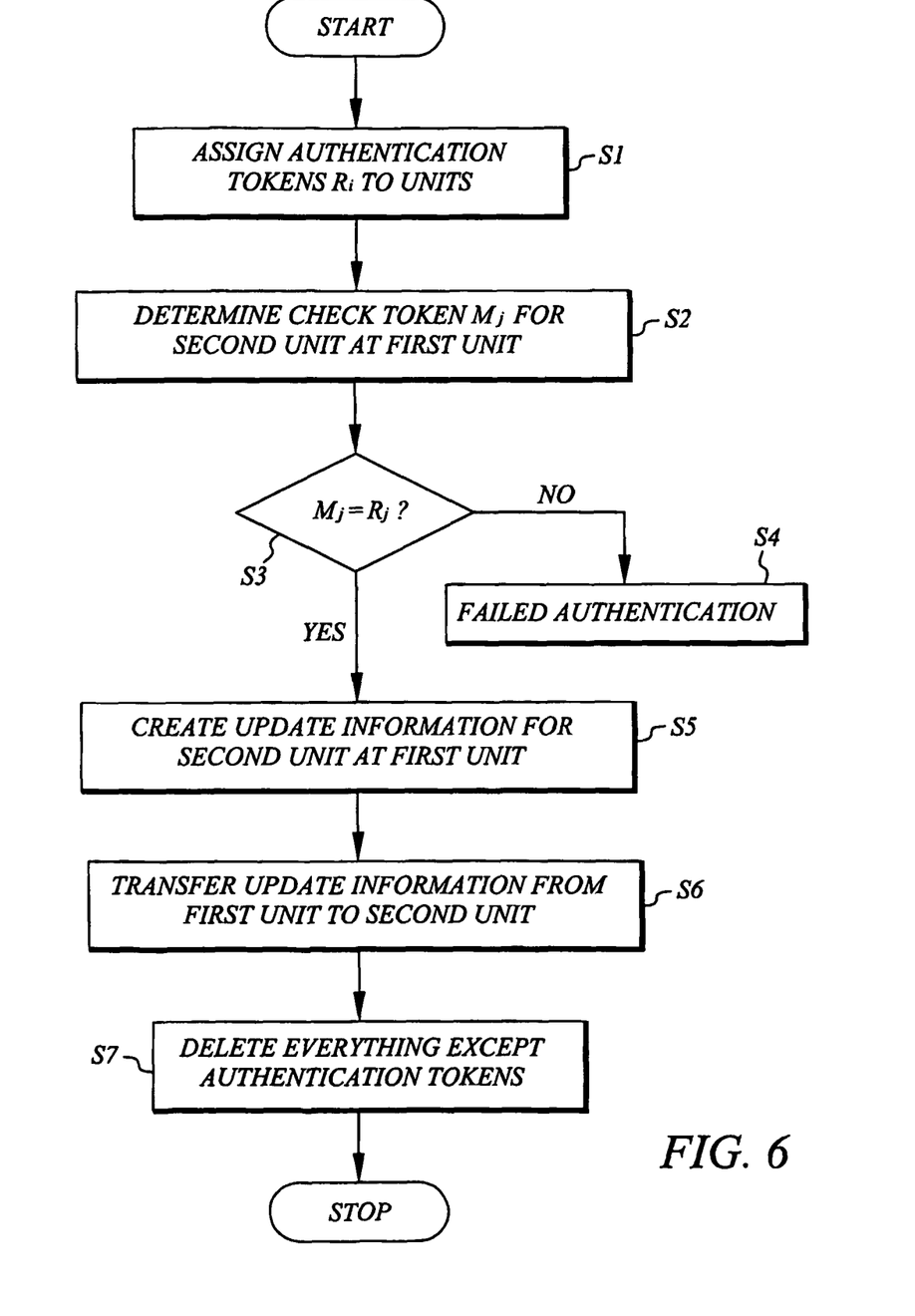
FIG. 6 is a flow chart of a preferred embodiment of the authentication method according to the present invention.

FIG. 6 is a flow chart of a preferred embodiment of the authentication method according to the invention with integrated update. Initially, all units in the group network are provided with a respective authentication token in step S1. The assignment of authentication tokens involves using the password P of the group but this is accomplished such that no individual authentication token alone can be used to recreate the password. When the group members have received their authentication tokens in this assigning phase, the actual authentication phase can be initiated by entering the password at a first unit chosen by the user. The first unit determines a check token for a second unit, more specifically the unit towards which authentication is needed, in step S2. The check token is securely transferred to the second unit, where it is compared with the authentication token assigned to this unit (step S3). The requirement for a successful authentication is that these tokens match completely. Should this not be the case, the authentication fails (step S4) and the second unit will not trust the manager of the first unit.

Identical tokens, on the other hand, means that the input password is successfully verified. In this case, the second unit accepts being updated by the first unit. Update information, including a new authentication token for the second unit, is then created at the first unit in step S5. In step S6, the generated update information is transferred to the second unit, possibly together with update information that is forwarded unchanged by the first unit. This transfer could be initiated in response to an authentication response message sent from the second unit. Alternatively, step S5 and possibly also S6 is performed at an earlier stage before the comparison in step S3. Step S5 can for example be simultaneous with the check token determination in step S2. Either way, a successful authentication comparison is always required for the second unit to accept being updated by the first unit. In a final step S7, all parameters used in the authentication process but the authentication tokens are erased from the group network, including the password.

The described mechanism for password-based authentication can be realized as a computer program product implemented in the group network. The computer program product could for example be an executable software module comprising program means for performing the steps of FIG. 6.

The main principles of the invention have now been explained, and the following paragraphs will be devoted to specific features and embodiments thereof.

Assigning Authentication Tokens

Before the actual authentication phase, authentication tokens $R_i$ (i=1, 2, . . . , n for a group of n devices) have to be assigned to all devices in the group.

Figure 7:
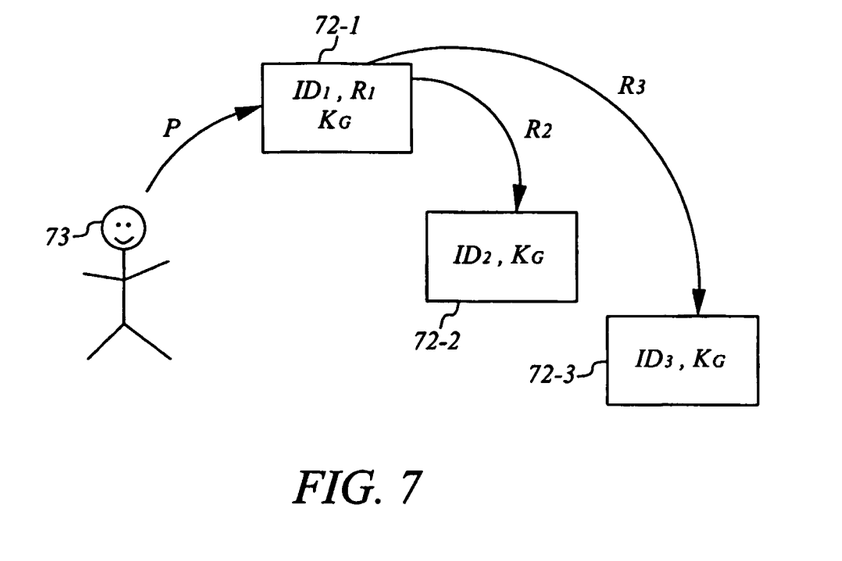
FIG. 7 illustrates an initial set-up procedure for forming a group network according to an exemplary embodiment of the present invention.

In an initial set-up phase, for instance when a new group network is formed, the authentication tokens $R_i$, and preferably also the group key $K_G$, are spread throughout the system. Referring to FIG. 7, one of the devices 72-1 is hereby selected to act as an "assigning device", creating its own authentication token as well as the authentication tokens for all other devices 72-2, 72-3. The assigning procedure normally starts when the user 73 enters the password P to the assigning device 72-1. This device generates a token secret S for the group, preferably using a random value generating function. For each other device 72-2, 72-3, device 72-1 then calculates an authentication token according to the following steps (j=2, 3):

$$H_j = f(ID_j \| P) \qquad \text{ix)}$$

$$R_j = E(H_j, S) \qquad \text{x)}$$

In a preferred embodiment, the authentication tokens $R_2$, $R_3$ are sent to the corresponding devices over secure connections, such as by using the pair keys $K_{1,2}$, $K_{1,3}$, and tamper-resistantly stored therein. However, in some cases these keys $K_{ij}$ are not available at the initial set up. Then, the devices preferably communicate by wire, Infrared or short-range wireless links during the initial phase to make eavesdropping difficult. This initial phase could include establishment of said keys. Alternatively, keys are manually entered to devices by the user/administrator.

Figure 8:
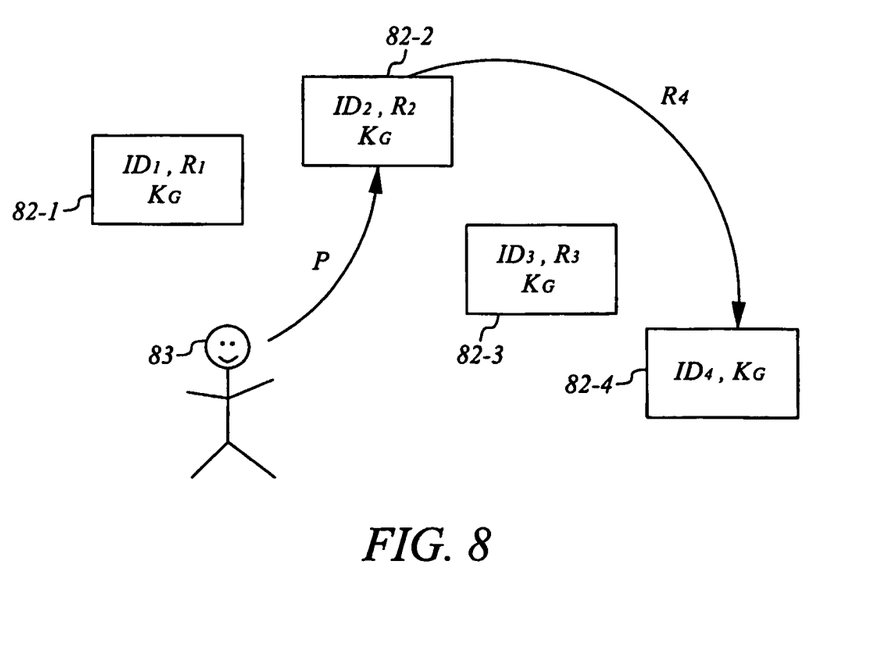
FIG. 8 illustrates addition of a new member to a group network according to an exemplary embodiment of the present invention.

When adding a new device to an already existing group network, a similar assigning procedure may be used, as illustrated in FIG. 8. Assume that the user 83 wants to add a new device 82-4 to the group network. He then inputs the password P to another device 82-2, which is already a member of the group and associated with an authentication token $R_2$. This authentication token $R_2$ is together with P and $ID_2$ used to unlock S and calculate $R_4$ at device 82-2 according to the following steps (i=2, j=4):

$$H_i = f(ID_i \| P) \qquad \text{xi)}$$

$$S = D(H_i, R_i) \qquad \text{xii)}$$

$$H_j = f(ID_j \| P) \qquad \text{xiii)}$$

$$R_j = E(H_j, S) \qquad \text{xiv)}$$

$R_4$ is with advantage securely sent from device 82-2 to device 82-4 using the key pair $K_{2,4}$. It should be emphasized that the user can select any suitable device 82-1, 82-2, 82-3 in the group to assign an authentication token for a new device. In particular, this assigning device 82-2 does not have to be identical to the assigning device (72-1 in FIG. 7) performing the initial authentication token spreading.

Again, all parameters participating in the assigning procedure except the authentication tokens are preferably erased after usage.

The Locking Function E

The locking function E used to determine the authentication tokens $R_i$ can be implemented in different ways in accordance with the invention. However, in order to retrieve S in the above-described assigning and authentication phases, E must be bijective in the second input, i.e. possible to convert into the inverse "unlocking" function D.

In a preferred embodiment the locking function E is a symmetric block encryption function, such as a well-known prior-art function like DES, AES, Blowfish or a simple bit-wise XOR. Other embodiments can be based on asymmetric functions instead, for example ElGamal encryption:

$$\begin{cases} E(x, y) = g^x y \bmod p \\ D(x, y) = g^{-x} y \bmod p \end{cases}$$

where p is an appropriate prime number and g is a generator of a large sub-group of $Z_p^*$. More information on the mentioned encryption functions as well as on general cryptography can for instance be found in "Handbook of Applied Cryptography" by A. J. Menezes, P. C. van Oorschot and S. C. Vanstone, CRC Press.

The basic property exploited in the locking function is that for each possible password P' there exists an S' which, if P' is correct, would have produced the authentication token $R_i$. Hence, it is not possible to use $R_i$ as a "witness" for a correctly guessed password. More precisely, given a candidate P', it can easily be verified that the value $S'=D(f(ID_i||P'), R_i)$ has this property, since $E(f(ID_i||P'), S')=R_i$.

Another approach, generalizing the above methods, is to use a new interpolation method referred to as password-based secret sharing. The locking function is then set as $$E(x, S)=ax+S (a\neq 0)$$

which corresponds to straight lines with slope a and intercepts S. Still referring to the line interpretation of the locking function, the basic idea is to share the secret to the line (i.e. to E) between the respective device and the user in the sense that each possesses a vital piece of information needed for determination thereof. Since a straight line is uniquely determined by two points, the secret sharing can be achieved by providing information of one point on the line in the device (through $R_i$), whereas the user password P is needed to obtain the other point.

The outlined password-based secret sharing may be accomplished in the following way. $E(H_i, S)$ is created for each i and the respective authentication tokens $R_i$ are set as:

$$R_i=\{x, E(x, S), E(H_i, S)\} (x\neq H_i)$$

where x is a random value equal for all $R_i$ in the group. In this case, $R_i$ contains both coordinates (x, E(x, S)) of one point on the "line" E but only one coordinate ($E(H_i, S)$) of the other point. The remaining coordinate ($H_i$) can only be determined by entering the password P at device i, since it is by definition a one-way function of P:

$$H_i=f(ID_i||P)$$

The unlocking is in this example achieved through interpolation with the decryption function D defined as:

$$D(H_i, R_i) = E(x, S) - x \cdot \frac{E(x, S) - E(H_i, S)}{x - H_i}$$

By using the above equation, the token secret S can be retrieved provided that P (and thus $H_i$) is known.

Delegation of Update Rights

If a user starts performing an update with a certain device and for some reason cannot continue although there are still devices left to update, it may be appropriate to apply a delegation scheme in accordance with another embodiment of the invention. The user then selects one or more group members that are authorized to update the remaining devices. This means that the update occurs via an intermediate device that has received update rights from the original updating device to which the password P was input.

Figure 9:
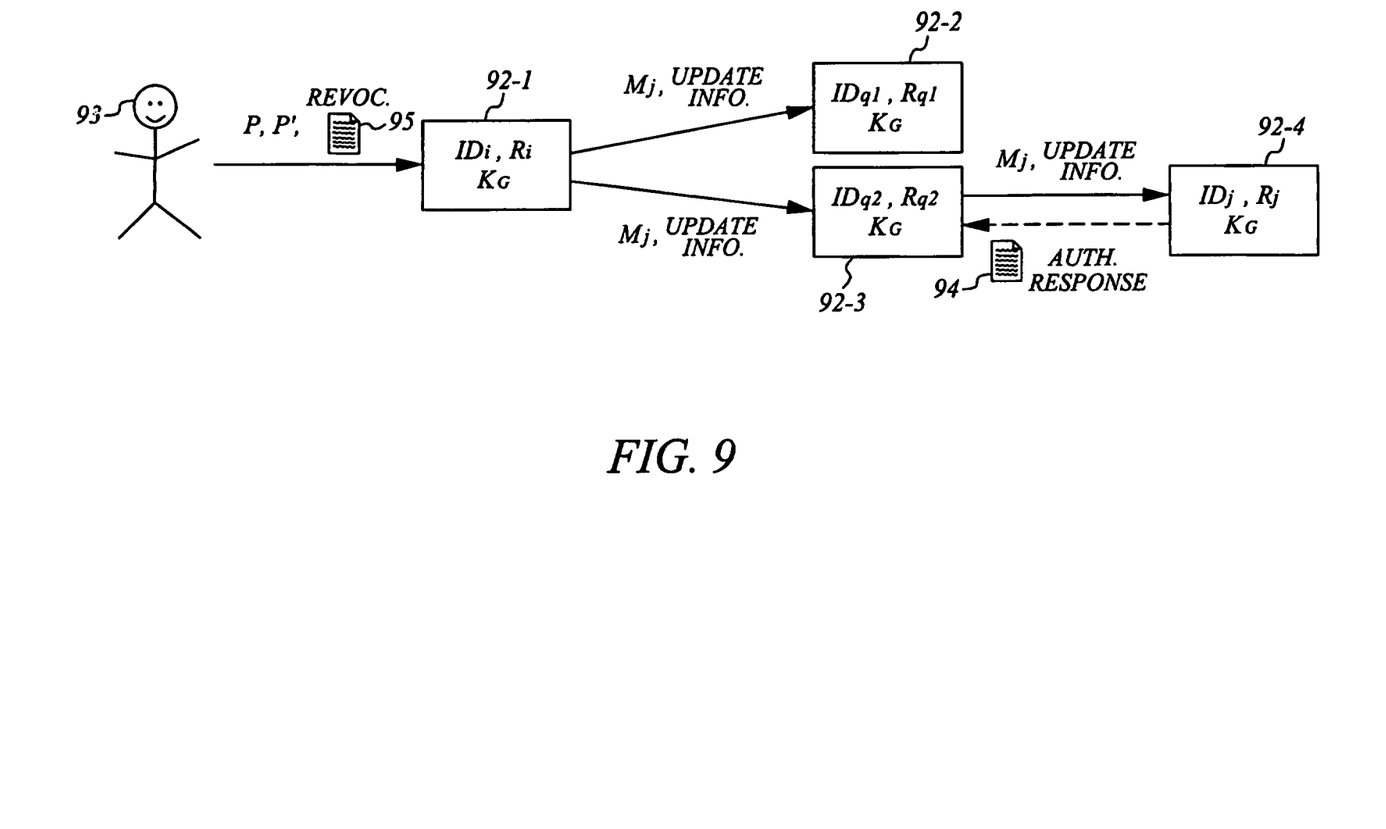
FIG. 9 illustrates delegation of update rights in accordance with an exemplary embodiment of the invention.

FIG. 9 schematically illustrates an exemplary embodiment of the invention where update rights are delegated from device i 92-1 to two intermediate devices q1 and q2 92-2, 92-3. Device i creates the check token $M_j$ and the new authentication token $R_j'$ for a non-updated device j 92-4 in accordance with steps iii, iv, vii and viii above. It sends $M_j$ and update information comprising $R_j'$ to both intermediate devices q1 and q2. In the illustrated example, device q2 has encountered the non-updated device j and forwards the update information to this device after a successful authentication.

In order to increase the possibility of a quick and reliable update of the remaining devices, it may thus be appropriate to delegate equivalent update rights to several intermediate devices. The device that first is able to communicate with a specific non-updated device, performs the update thereof. The scenario that another update-authorized device later encounters this already updated device, can be handled in different ways. One possibility is that an updated device is instructed to ignore multiple update attempts. Another is that the update-authorized device recognizes that there has already been an update and that no further action is needed. Means for achieving this will be described in the following. A final way of dealing with multiple update attempts would be to simply allow them. This leads to unnecessary signaling in the network but will generally not cause any significant problems.

In the proposed delegation scheme the update information is still created at the original updating device (92-1 in FIG. 9) although at least a portion thereof is transferred via the intermediate device(s). Consequently, the password P still only needs to be exposed at one group member. This constitutes yet another advantageous feature of the invention, and enables embodiments where the delegation of update rights includes delegation of rights to further delegate the update rights. In other words, the update can occur through two or more intermediate devices, resulting in a chain of group members participating in the updating process. Irrespective of the number of intermediate devices, the password P is restricted to the first device and in this regard the secure password management of the invention is maintained.

Irrespective of whether the delegation involves a single intermediate device or several devices, the update rights may with advantage be accompanied by a time stamp in accordance with a further embodiment of the invention. The time stamp facilitates determining of whether the update information is still valid at the point of time when the intermediate device actually encounters one of the devices concerned by the update rights. Preferably, the time stamp comprises a generation identity $ID_G$, indicating to which update generation the update information belongs. For comparison purposes, the devices in the group also have $ID_G$ parameters. During an ongoing update process some devices could for instance be updated with a new generation identity $ID_G$, while others are still associated with the previous $ID_G$. The generation identities $ID_G$ of the devices are generally closely related to and updated at the same time as the group key $K_G$.

By means of the time stamp, a device q encountering a device j for which it has update information can determine if an update is still of interest by checking whether the update information belongs to a later generation than the current generation identity $ID_G$ of device j. By keeping track of different update events in the described manner, delayed update events can be recognized and ignored.

Preferably, the delegation of update rights involves an active choice by the user regarding which group members that should have the right to perform update actions, as described above. However, the invention also covers solutions where the original updating device automatically initiates the delegation in response to a failed or interrupted update process.

Authentication Response Message and Update Policies

In accordance with the basic principles of the invention, a user enters a password to a device that verifies it with another device. The first device does not know the outcome of the authentication and nor does the user. In some cases an accept/ reject signal may be desired and in accordance with some embodiments of the invention an authentication response message (34; 44; 94 of FIGS. 3, 4 and 9) is therefore sent back to the first device to indicate the authentication result. In case of failure it can also be appropriate to generate an error audit log message.

The advantage of the authentication response message is that it makes it possible for the user to see whether he entered the correct password. However, sending a response message also introduces a problem, since it practically immediately reveals if a password tried by an attacker at a stolen device is correct or not. It would thus be possible for the attacker to try many different passwords by repeatedly sending information to several non-updates devices. To avoid this, policies regulating the authentication are preferably implemented in some or all devices in the group network. These policies may for instance impose a limit on the number on password attempts. Each device could e.g. be instructed to only accept three subsequent password attempts.

There may also be policies focusing on the frequency of the password attempts, such that the response message displayed to the user is exponentially delayed as the number of password attempts increases. An attacker then has to wait longer and longer for the result of each password attempt, making it practically impossible to carry through with the large number of attempts that statistically would be needed to find the correct password. Such delay policies are preferably combined with a limit on the number of password attempts but could also be separately applied.

According to other embodiments of the invention, an alarm signal for the user is generated if a predetermined number of password attempts is exceeded. The alarm signal is created at the attacked unit and preferably sent to one or several other group members as soon as appropriate communication paths can be established. When the alarm message reaches the group manager he can take appropriate measures, such as initiating a revocation, in response thereto.

Mutual Authentication

Another advantageous feature of the proposed method is that it can be extended to allow two-way authentication, where not only a first device is authenticated towards a second device but the second device is at the same time authenticated towards the first device. By means of this mutual authentication a trust relationship is established between a pair of devices in the group network.

Two exemplary implementations of a mechanism for mutual authentication between a device i and a device j in accordance with the invention are given in Protocol A and B below. Both solutions involves additional security measures to protect the authentication token $R_j$ and involves temporary test secrets that are based on random values generated at the respective unit. This results in authentication comparisons between parameters representing the authentication tokens, i.e. between indirect authentication tokens. The communication between device i and j below is preferably protected by means of the key pair $K_{ij}$.

Protocol A

Define $f(R, z)$ as an appropriate pseudo-random function, e.g. AES with key R and input z, and let $\|$ denote concatenation of bit strings.

Protocol B

Define p as an appropriate prime number and g as a generator of $Z_p$ and let $\|$ denote concatenation of bit strings.

The solution in Protocol A has the advantage of being very straight-forward. Nevertheless, it theoretically leads to a somewhat reduced password security, since extensive guessing might lead to the password. In practice, this normally does not constitute a problem, and in case of concern an encryption encapsulated Protocol A can be used.

In Protocol B, the authentication tokens are hidden through additional security steps. The procedure is based on exchanging a key $g^{xy}$ common for the two devices and determined by one random value from each device, x and y. The key exchange occurs through transfer of the parameters a and b. txt1 and txt2 are text strings of arbitrary length concatenated with a and b to form the second input parameter of the one-way function HMAC. For further information on HMAC, reference is made to IETF: "HMAC, Keyed-Hashing for Message Authentication" (RFC 2104).

Critical Operations

It may in some cases be appropriate to distinguish between critical operations, for which user authentication is required, and other less important operations in the group network. For this purpose, a preferred embodiment of the invention implements policies defining critical operations at some or all units in the group. One way would be to simply use a look-up table accessed from the units. The policies are stored either at the units or externally.

The critical operations comprise both operations requiring update of some devices in the group, such as revocation, and operations that do not involve information update but still require authentication. The latter typically holds for operations performed in order to access objects or services associated with high security demands, such as opening a safe or retrieving secret information from a server.

Although the invention has been described with reference to specific illustrated embodiments, it should be emphasized that it also covers equivalents to the disclosed features, as well as modifications and variants obvious to a man skilled in the art. Thus, the scope of the invention is only limited by the enclosed claims.

The invention claimed is:

1. A method for password-based authentication in a communication system including a group of at least two units associated with a common password, wherein each of said two units comprises at least one processor and at least one memory, said at least one memory containing instructions that, when executed by said at least one processor, are operative to perform the steps of:
   assigning individual authentication tokens to the respective units in the group based on the password such that each authentication token is irreversibly determined by the password;
   determining, in a first unit, a check token for a second unit based on the password inputted by a user of said first unit and the authentication token of the first unit, wherein the step of determining the check token comprises the steps of:
      determining, in the first unit, a token secret using the authentication token of the first unit and the password; and,
      creating, in the first unit, the check token for the second unit based on the token secret and the password;
   sending the check token to the second unit; and,
   comparing, in the second unit, the check token with the authentication token of the second unit for authentication of the first unit towards the second unit, wherein said user of said first unit is authenticated if said check token is the same as said authentication token of said second unit.

2. The method of claim 1, further comprising the step of: deleting the password and all significant parameters generated except the authentication tokens after usage thereof.

3. The method of claim 1, further comprising the step of: accepting, in the second unit, in response to a successful authentication, update information securely transferred from the first unit, at least a portion of the update information being created at the first unit.

4. The method of claim 3, wherein the update information is associated with revocation of a non-trusted group member.

5. The method of claim 3, wherein the update information relates to a password change.

6. The method of claim 3, wherein the update information is selected from the group consisting of:
   new authentication tokens,
   a new group key, a group-defining list, and,
   a revocation list, including combinations thereof.

7. The method of claim 3, further comprising the step of delegating update rights to a third intermediate unit, and sending at least a portion of the update information for the second unit to the intermediate unit.

8. The method of claim 7, wherein the update information is accompanied by a time stamp for determining whether the update information is still valid when the intermediate unit encounters the second unit.

9. The method of claim 7, wherein the delegation of update rights comprises delegation of rights to further delegate update rights.

10. The method of claim 3, wherein a unit that is switched-on after being inactive for a predetermined period of time automatically requests appropriate update information from at least two other units.

11. The method of claim 1, wherein the assigning step further comprises the steps of:
   determining, in an assigning unit in the group, a token secret common for the group and non-correlated with the password; and,
   creating, in the assigning unit, the authentication token for another unit in the group based on the token secret common for the group and the password.

12. The method of claim 11 wherein the step of determining the token secret common for the group involves generating the token secret as a part of an initial set-up procedure.

13. The method of claim 11, wherein the creating step involves using a bijective locking function having input parameters which include the token secret common for the group and a one-way function of the password.

14. The method of claim 13, wherein the locking function is a symmetric encryption function.

15. The method of claim 13, wherein the locking function is implemented through password-based secret sharing.

16. The method of claim 1, further comprising policies in at least one of the units in the group for limiting a number and/or frequency of authentication attempts.

17. The method of claim 1, further comprising the step of generating an alarm signal if a number of authentication attempts exceeds a predetermined value.

18. The method of claim 1, further comprising the step of sending an authentication response message from the second unit indicating a result of the comparing step.

19. The method of claim 1, further comprising the step of authentication of the second unit towards the first unit, whereby the first and second units are mutually authenticated towards each other.

20. The method of claim 19, further comprising the steps of:
   generating a respective random value in the first and second unit;
   determining temporary test secrets in the first and second unit based on the random values; and,
   exchanging the temporary test secrets between the first and second unit for mutual authentication purposes.

21. The method of claim 1, wherein critical operations for which authentication is needed are listed in policies in at least one of the units.

22. The method of claim 1, wherein the group of units constitutes a Personal Area Network (PAN).

23. The method of claim 1, wherein the authentication tokens are tamper-resistantly stored in the respective units.

24. A communication system including a group of at least two units associated with a common password, and means for password-based authentication, comprising:
- means for assigning individual authentication tokens to the respective units in the group based on the password such that each authentication token is irreversibly determined by the password;
- means for determining, at a first unit, a check token for a second unit based on the password and the authentication token of the first unit; and
- means for comparing, at the second unit, the check token with the authentication token of the second unit for authentication of the first unit towards the second unit;
- wherein the means for determining the check token comprises:
  - means for retrieving, at the first unit, a token secret using the authentication token of the first unit and the password; and,
  - means for creating, at the first unit, the check token for the second unit based on the token secret and the password.

25. The system of claim 24, further comprising means for deleting the password and parameters generated except the authentication tokens after usage thereof.

26. The system of claim 24, further comprising;
- means for transferring update information from the first unit to the second unit; and,
- means for accepting, at the second unit, update information from the first unit in response to a successful authentication.

27. The system of claim 26, wherein the update information is associated with revocation of a non-trusted group member.

28. The system of claim 26, wherein the update information relates to a password change.

29. The system of claim 26, wherein the update information is selected from the group consisting of new authentication tokens, a new group key, a group-defining list, and a revocation list, including combinations thereof.

30. The system of claim 26, further comprising means for delegation of update rights to a third intermediate unit, and means for sending at least a portion of the update information for the second unit to the intermediate unit.

31. The system of claim 24, wherein the means for assigning further comprises:
- means for determining, at an assigning unit in the group, a token secret common for the group and non-correlated with the password; and,
- means for creating, at the assigning unit, the authentication token for another unit in the group based on the token secret and the password.

32. The system of claim 31, wherein the means for creating involves a bijective locking function having input parameters which include the token secret and a one-way function of the password.

33. The system of claim 24, further comprises policies implemented in at least one of the units in the group for limiting a number and/or frequency of authentication attempts.

34. The system of claim 24, further comprising means for generating an alarm signal if a number of authentication attempts exceeds a predetermined value.

35. The system of claim 24, further comprising means for sending an authentication response message from the second unit.

36. The system of claim 24, further comprising means for mutual authentication between two units in the group.

37. The system of claim 24, wherein said communication system being a Personal Area Network (PAN).

38. A first device belonging to a group of at least two devices associated with a common password, and including means for password-based authentication, the first device comprises:
- means for receiving a password; means for assigning individual authentication tokens to other devices in the group based on the password such that each authentication token is irreversibly determined by the password;
- means for determining a check token for a second device in the group based on the password and the authentication token of the first device; and
- means for transmitting the check token to the second device for authentication towards the second device;
- wherein the means for determining the check token comprises:
  - means for retrieving a token secret using the authentication token of the first device and the password; and,
  - means for creating the check token for the second device based on the token secret and the password.

39. The first device of claim 38, further comprising means for deleting the password and parameters generated except the authentication token after usage thereof.

40. The first device of claim 38, further comprising:
- means for creating update information for the second device; and,
- means for securely transferring update information to the second device.

41. The first device of claim 40, further comprising means for delegation of update rights to an intermediate device, and means for sending update information for the second device to the intermediate device.

42. The first device of claim 38, wherein the means for assigning further comprises:
- means for determining a token secret common for the group and non-correlated with the password; and,
- means for creating the authentication token for another device in the group based on the token secret and the password.

* * * * *

UNITED STATES PATENT AND TRADEMARK OFFICE
CERTIFICATE OF CORRECTION

PATENT NO. : 8,745,715 B2
APPLICATION NO. : 10/552955
DATED : June 3, 2014
INVENTOR(S) : Lindholm et al.

It is certified that error appears in the above-identified patent and that said Letters Patent is hereby corrected as shown below:

In the Specification

Column 4, Line 10, delete "AU" and insert -- All --, therefor.

Column 5, Line 13, in Equation "iv)", delete "$M_j 32\ E(H_j, S)$" and insert -- $M_j = E(H_j, S)$ --, therefor.

Column 8, Line 9, in Equation "ix)", delete "$H_j = (ID_j \| P)$" and insert -- $H_j = f(ID_j \| P)$ --, therefor.

Column 10, Line 46, delete "$ID_G$," and insert -- $ID_G'$, --, therefor.

In the Claims

Column 13, Line 40, Claim 1, delete "of;" and insert -- of: --, therefor.

Column 15, Line 24, Claim 26, delete "comprising;" and insert -- comprising: --, therefor.

Signed and Sealed this
Twenty-third Day of September, 2014

Michelle K. Lee
*Deputy Director of the United States Patent and Trademark Office*